US011388599B2

(12) United States Patent
Liu et al.

(10) Patent No.: US 11,388,599 B2
(45) Date of Patent: Jul. 12, 2022

(54) DEVICE-TO-DEVICE SUBSCRIBER IDENTITY MODULE SHARING METHOD AND ASSOCIATED APPARATUSES

(71) Applicant: MEDIATEK INC., Hsin-Chu (TW)

(72) Inventors: Wei-Lun Liu, Hsin-Chu (TW);
Huei-Jing Yang, Hsinchu (TW);
Ming-Pei Hsu, Hsinchu (TW)

(73) Assignee: MEDIATEK INC., Hsin-Chu (TW)

(*) Notice: Subject to any disclaimer, the term of this patent is extended or adjusted under 35 U.S.C. 154(b) by 0 days.

(21) Appl. No.: 16/796,857

(22) Filed: Feb. 20, 2020

(65) Prior Publication Data
US 2020/0359211 A1    Nov. 12, 2020

Related U.S. Application Data

(60) Provisional application No. 62/845,411, filed on May 9, 2019.

(51) Int. Cl.
H04W 12/43       (2021.01)
H04W 76/14       (2018.01)
H04W 92/18       (2009.01)
H04W 88/06       (2009.01)

(52) U.S. Cl.
CPC .......... *H04W 12/43* (2021.01); *H04W 76/14* (2018.02); *H04W 88/06* (2013.01); *H04W 92/18* (2013.01)

(58) Field of Classification Search
CPC combination set(s) only.
See application file for complete search history.

(56) References Cited

U.S. PATENT DOCUMENTS

| 2009/0111378 | A1* | 4/2009 | Sheynman | H04M 1/72412 |
| | | | | 455/41.1 |
| 2014/0057600 | A1* | 2/2014 | Dung | H04B 1/3816 |
| | | | | 455/411 |
| 2017/0070346 | A1* | 3/2017 | Lombardi | H04W 12/08 |
| 2019/0223017 | A1* | 7/2019 | Lai | H04W 60/00 |
| 2019/0230501 | A1* | 7/2019 | He | H04W 12/43 |

FOREIGN PATENT DOCUMENTS

WO    2017/182844 A1    10/2017

* cited by examiner

*Primary Examiner* — Cindy Trandai
(74) *Attorney, Agent, or Firm* — Winston Hsu

(57) ABSTRACT

A customer premise equipment (CPE) includes a control circuit, a storage device, and a wireless communication circuit. The storage device stores a virtual subscriber identity module (SIM). When the control circuit enables virtual SIM functionality on the CPE, the wireless communication circuit establishes a wireless communication link with a cellular telephone network via the virtual SIM.

16 Claims, 3 Drawing Sheets

DEVICE-TO-DEVICE SUBSCRIBER IDENTITY MODULE SHARING METHOD AND ASSOCIATED APPARATUSES

CROSS REFERENCE TO RELATED APPLICATIONS

This application claims the benefit of U.S. provisional application No. 62/845,411, filed on May 9, 2019 and incorporated herein by reference.

BACKGROUND

The present invention relates to wireless communications, and more particularly, to a device-to-device subscriber identity module (SIM) sharing method and associated apparatuses.

A customer premises equipment (CPE) is a device located on the customer's premises (physical location), and is generally connected to a power socket via a power cable. The CPE can serve as a wireless fidelity (Wi-Fi) hotspot device for converting high-speed cellular telephone network signals into Wi-Fi signals. For example, the CPE establishes a wireless communication link with a fourth generation of cellular technology (4G) network, and converts 4G signals into Wi-Fi signals to act as a Wi-Fi hotspot service. For another example, the CPE establishes a wireless communication link with a fifth generation of cellular technology (5G) network, and converts 5G signals into Wi-Fi signals to act as a Wi-Fi hotspot service. To establish a wireless communication link with a 4G/5G network, the typical CPE requires a physical subscriber identity module (SIM) card installed therein.

Furthermore, a cellular phone with a physical 4G/5G SIM card installed therein can enable a Wi-Fi hotspot function for sharing the Internet access. However, due to hardware cost consideration, an access point (AP) mode of the cellular phone may support up to 802.11ac only. As a result, the data throughput between a cellular phone operating under a Wi-Fi AP mode and a cellular phone operating under a Wi-Fi station (STA) mode is limited. In other words, the cellular phone operating under the Wi-Fi STA mode cannot fully use the bandwidth of the high-speed 5G network. In addition, when a user travels abroad, he/she needs to buy a local SIM card for allowing his/her cellular phone to access a local cellular telephone network. Typically, one physical 4G/5G SIM card cannot be shared by different cellular phones for accessing the cellular telephone network.

SUMMARY

One of the objectives of the claimed invention is to provide a device-to-device subscriber identity module (SIM) sharing method and associated apparatuses.

According to a first aspect of the present invention, an exemplary customer premise equipment (CPE) is disclosed. The exemplary CPE includes a control circuit, a storage device, and a wireless communication circuit. The control circuit is arranged to enable virtual subscriber identity module (SIM) functionality on the CPE. The storage device is arranged to store a virtual SIM. The wireless communication circuit is arranged to establish a first wireless communication link with a cellular telephone network via the virtual SIM.

According to a second aspect of the present invention, an exemplary electronic device is disclosed. The exemplary electronic device includes a control circuit, a storage device, and a wireless communication circuit. The control circuit is arranged to enable virtual subscriber identity module (SIM) functionality on the electronic device. The storage device is arranged to store a virtual SIM. The wireless communication circuit is arranged to establish a first wireless communication link with another electronic device that has a physical SIM installed therein, and perform data exchange with said another electronic device for obtaining data of the physical SIM from said another electronic device via the first wireless communication link, wherein the virtual SIM is configured according to the data of the physical SIM; and further arranged to establish a second wireless communication link with a cellular telephone network via the virtual SIM, wherein the first wireless communication link and the second wireless communication link comply with different wireless protocols.

According to a third aspect of the present invention, an exemplary device-to-device subscriber identity module (SIM) sharing method is disclosed. The exemplary device-to-device SIM sharing method includes: establishing a first wireless communication link with an electronic device that has a physical SIM installed therein; performing data exchange with the electronic device for obtaining data of the physical SIM from the electronic device via the first wireless communication link; configuring a virtual SIM according to the data of the physical SIM, and storing the virtual SIM into a storage device; and enabling virtual SIM functionality, and establishing a second wireless communication link with a cellular telephone network via the virtual SIM, wherein the first wireless communication link and the second wireless communication link comply with different wireless protocols.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
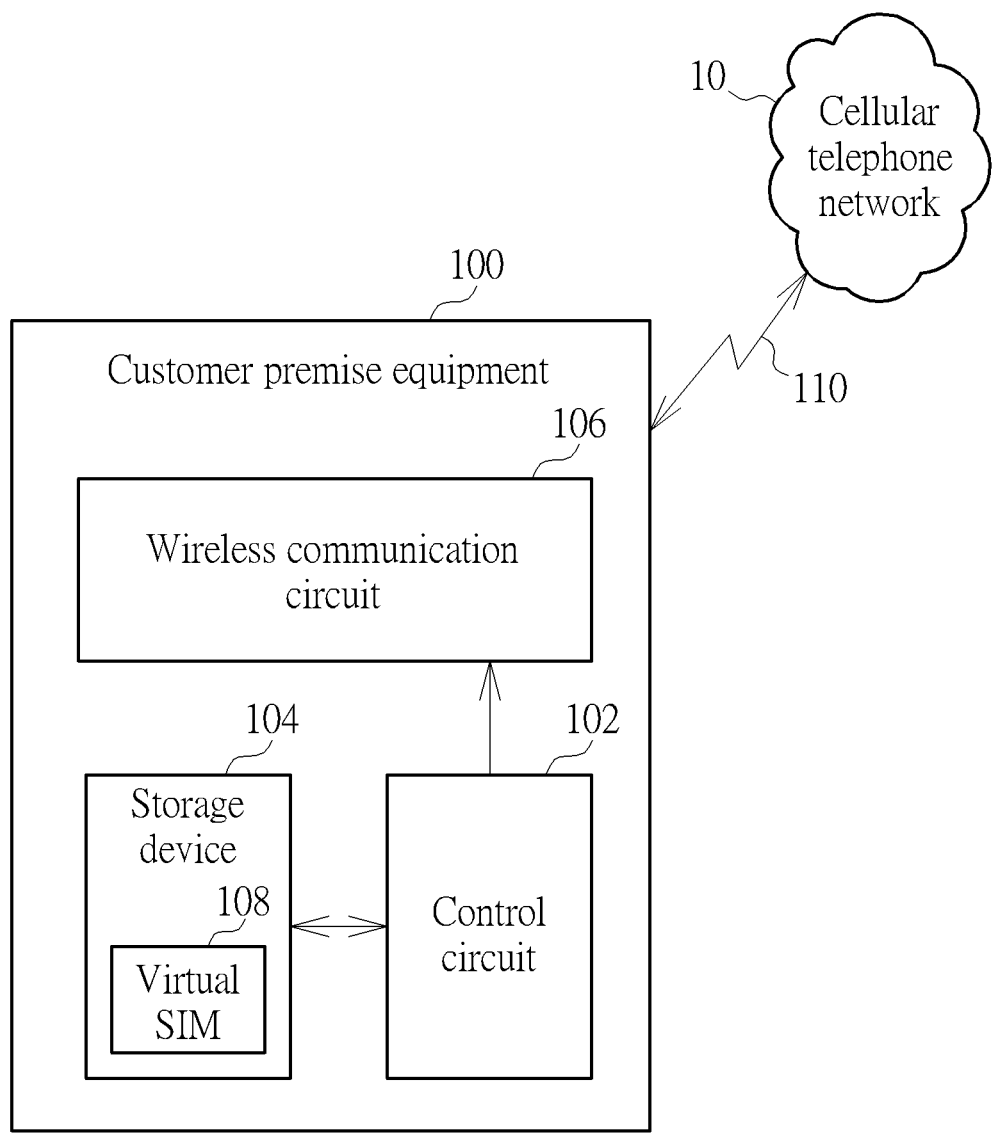
FIG. 1 is a diagram illustrating a customer premise equipment (CPE) with virtual subscriber identity module (SIM) functionality according to an embodiment of the present invention.

FIG. 1 is a diagram illustrating a customer premise equipment (CPE) with virtual subscriber identity module (SIM) functionality according to an embodiment of the present invention. The CPE 100 includes a control circuit 102, a storage device 104, and a wireless communication circuit 106. The control circuit 102 may be a processor that controls the overall operation of the CPE 100. The storage device 104 may be an internal memory device such as a random access memory or a flash memory. The wireless communication circuit 106 may include a baseband processing block and a radio-frequency (RF) processing block. In this embodiment, the wireless communication circuit 106 may employ Multiple-Radio Access Technology (Multi-RAT) architecture to support different wireless protocols. The storage device 104 is arranged to store a virtual SIM 108. The control circuit 102 is arranged to enable virtual SIM functionality on the CPE 100. For example, software running on the control circuit 102 reads the virtual SIM 108 from the storage device 104, and simulates physical SIM behavior according to the virtual SIM 108. For example, the virtual SIM 108 may be a data set including a service-subscriber key used to identify a subscriber to a cellular telephone network (e.g., 5G network) 10, and virtual SIM functionality can be implemented on the CPE 100 through a software application running on the control circuit 102. The CPE 100 may employ a Linux platform or any other suitable platform. The proposed virtual SIM application may be developed under the Linux environment or any other environment, depending on the platform the CPE 100 employs. When the virtual SIM functionality is enabled, the wireless communication circuit 106 may be arranged to establish a wireless communication link 110 with the cellular telephone network 10 via the virtual SIM 108.

It should be noted that the term "virtual SIM" means that no SIM hardware is required for enabling the virtual SIM functionality on the CPE 100. For example, the control circuit 102 enables virtual SIM functionality on the CPE 100 without needing any physical SIM, such as a removable SIM card installed in the CPE 100 or an embedded SIM (eSIM) soldered on the CPE 100. It should be noted that the term "physical SIM" means that dedicated SIM hardware is required for enabling the SIM functionality.

In some embodiment of the present invention, the virtual SIM 108 is configured according to data of a physical SIM that are obtained through a proposed device-to-device SIM sharing method. For example, when a mobile terminal with a physical 5G SIM card installed therein is in the proximity of the CPE 100, 5G SIM sharing between the CPE 100 and the nearby mobile terminal can be initiated. For better understanding of the technical features, an example of device-to-device SIM sharing is given as below.

Figure 2:
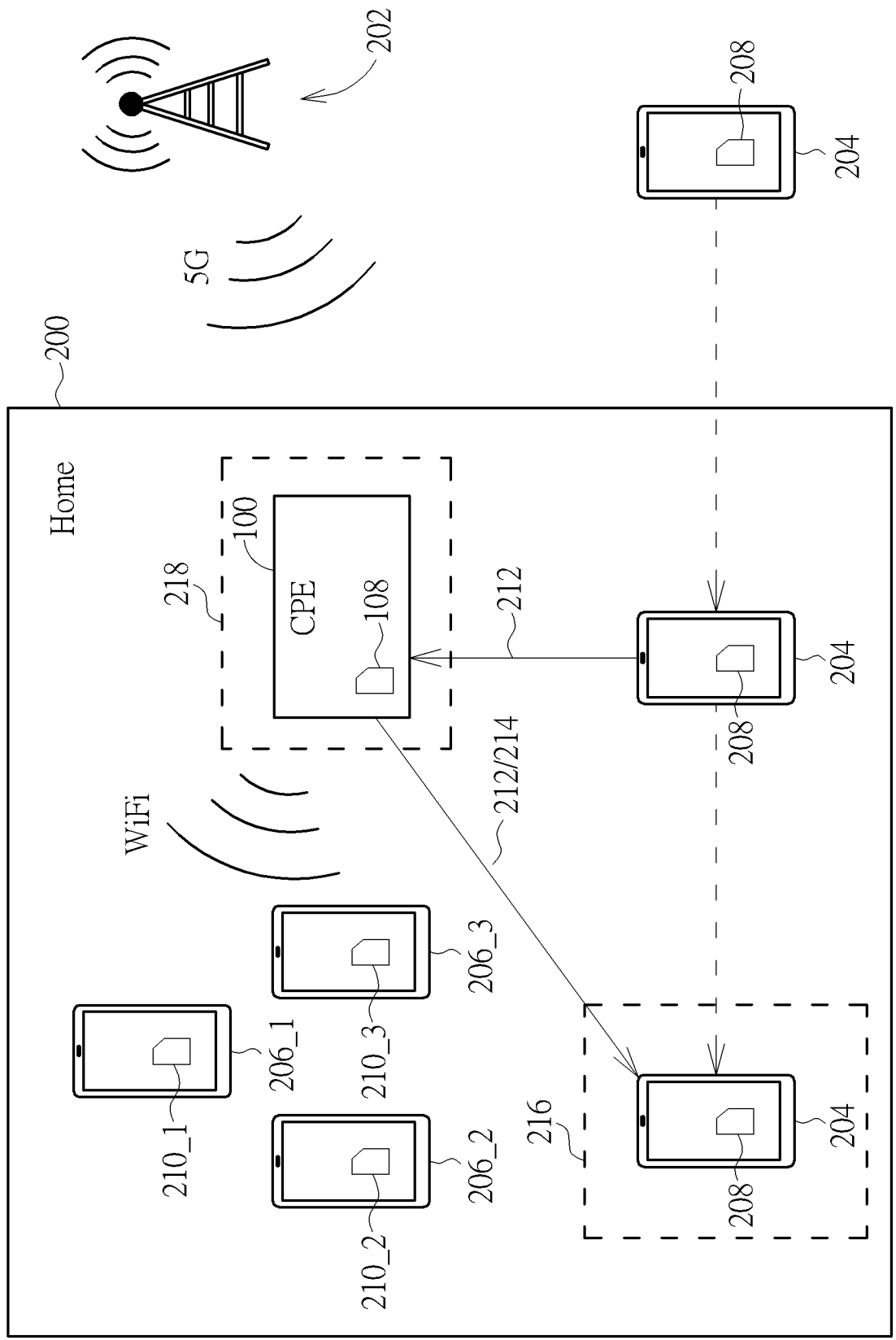
FIG. 2 is a diagram illustrating a device-to-device SIM sharing scenario for the CPE shown in FIG.1 according to an embodiment of the present invention.

Please refer to FIG. 1 in conjunction with FIG. 2. FIG. 2 is a diagram illustrating a device-to-device SIM sharing scenario for the CPE 100 shown in FIG. 1 according to an embodiment of the present invention. The CPE 100 is installed at user's home 200. A base station 202 of the cellular telephone network 10 is located outside user's home 200. A cellular phone 204 carried by a user has a physical 5G SIM card 208 installed therein. When the user enters his/her home 200 and moves to the proximity of the CPE 100, a 5G SIM sharing procedure between the CPE 100 and the nearby cellular phone 204 can be initiated. The wireless communication circuit 106 is further arranged to establish a wireless communication link 212 with an electronic device with a physical SIM installed therein (e.g., cellular phone 204 with the physical 5G SIM card 208), and perform data exchange with the electronic device for obtaining data of the physical SIM from the electronic device via the wireless communication link 212, such that the virtual SIM 108 is configured according to the data of the physical SIM. For example, the wireless communication link 212 may be a Wireless Fidelity (Wi-Fi) link, such as a Wi-Fi-P2P link or a Wi-Fi-Hotspot link. For another example, the wireless communication link 212 may be a Bluetooth (BT) link.

In this embodiment shown in FIG. 2, virtual SIM technique is employed for achieving transfer of 5G SIM capability. For example, the virtual SIM 108 can be configured by data of the physical SIM (e.g., 5G SIM card 208) according to the Soft SIM technique. For another example, the virtual SIM 108 can be configured by data of the physical SIM (e.g., 5G SIM card 208) according to the Remote SIM technique. Furthermore, the SIM authentication between the virtual SIM 108 and a virtual SIM server (not shown) may be achieved through the cellular phone 204 with the physical 5G SIM card 208. Hence, the CPE 100 may not be required to have Internet access capability before the virtual SIM functionality is enabled on it.

After the virtual SIM 108 is created and stored in the storage device 104, the control circuit 102 may enable the virtual SIM functionality, such that the wireless communication circuit 106 may establish the wireless communication link 110 with the cellular telephone network 10 (particularly, base station 202 of cellular telephone network 10) via the virtual SIM 108. In addition, the control circuit 102 may enable Wi-Fi hotspot functionality on the CPE 100, such that the CPE 100 may operate under a Wi-Fi STA mode and communicates with multiple cellular phones 206_1, 206_2, 206_3 and 204 each operating under a Wi-Fi AP mode. In this embodiment, the cellular phone 206_1 has a physical 4G SIM card 210_1 installed therein, the cellular phone 206_2 has a physical 4G SIM card 210_2 installed therein, and the cellular phone 206_3 has a physical 4G SIM card 210_3 installed therein. Since 5G SIM capability is transferred from the cellular phone 204 to the CPE 100, the CPE 100 can use the 5G bandwidth for accessing the Internet. In other words, the cellular phones 206_1, 206_2, 206_3 and 204 can share the Wi-Fi bandwidth for communicate with the CPE 100 and share the 5G bandwidth for accessing the Internet. Since transfer of 5G SIM capability allows the cellular phone 204 to operate under an AP mode without acting as a Wi-Fi hotspot device, the power consumption of the cellular phone 204 can be reduced greatly.

After 5G SIM capability is transferred from the cellular phone 204 to the CPE 100, the cellular phone 204 may be unable to directly receive any voice call via CS (Circuit Switched) or VoLTE (voice over LTE). The CPE 100 may also support a voice call relay function. For example, the wireless communication circuit 106 may be further arranged to relay a voice call to the electronic device with the physical SIM installed therein (e.g., cellular phone 204 with the physical 5G SIM card 208) via the wireless communication link 212. That is, the wireless communication link 212 (e.g., Wi-Fi link or BT link) established for 5G SIM capability transfer can also be used for voice call relay. However, this is not meant to be a limitation of the present invention. Alternatively, the wireless communication link 212 (e.g., Wi-Fi link or BT link) established for 5G SIM capability transfer may be different from a wireless communication link established for voice call relay.

For another example, the wireless communication circuit 106 is further arranged to establish a wireless communication link 214 with the electronic device with the physical SIM installed therein (e.g., cellular phone 204 with the physical 5G SIM card 208), and relay a voice call to the electronic device via the wireless communication link 214, where the wireless communication link 214 and the wireless communication link 212 may comply with different wireless protocols. By way of example, but not limitation, the wireless communication link 214 may be a BT link if the wireless communication link 212 is a Wi-Fi link, and the wireless communication link 214 may be a Wi-Fi link if the wireless communication link 212 is a BT link. In another example, the wireless communication link 214 and the wireless communication link 212 may comply with the same wireless protocol.

The CPE 100 may be located at a high signal strength area 218 covered by the cellular telephone network 10. When the user moves to a low signal strength area 216 covered by the cellular telephone network 10, the CPE 100 with voice call relay functionality can extend the signal coverage, thereby saving additional base station deployment. In other words, the signal coverage can benefit from transfer of 5G SIM capability. Here the signal strength or signal coverage could mean the strength or coverage of a CS signal, a VoLTE signal, a 3G signal, a 4G signal, a 5G signal, etc.

As mentioned above, a device-to-device SIM sharing method is employed for configuring the virtual SIM 108 stored in the storage device 104 of the CPE 100 according to data of the physical 5G SIM card 208 installed in the cellular phone 204. However, this is for illustrative purposes only, and is not meant to be a limitation of the present invention. In practice, the same device-to-device SIM sharing concept may be applied to other electronic devices.

Figure 3:
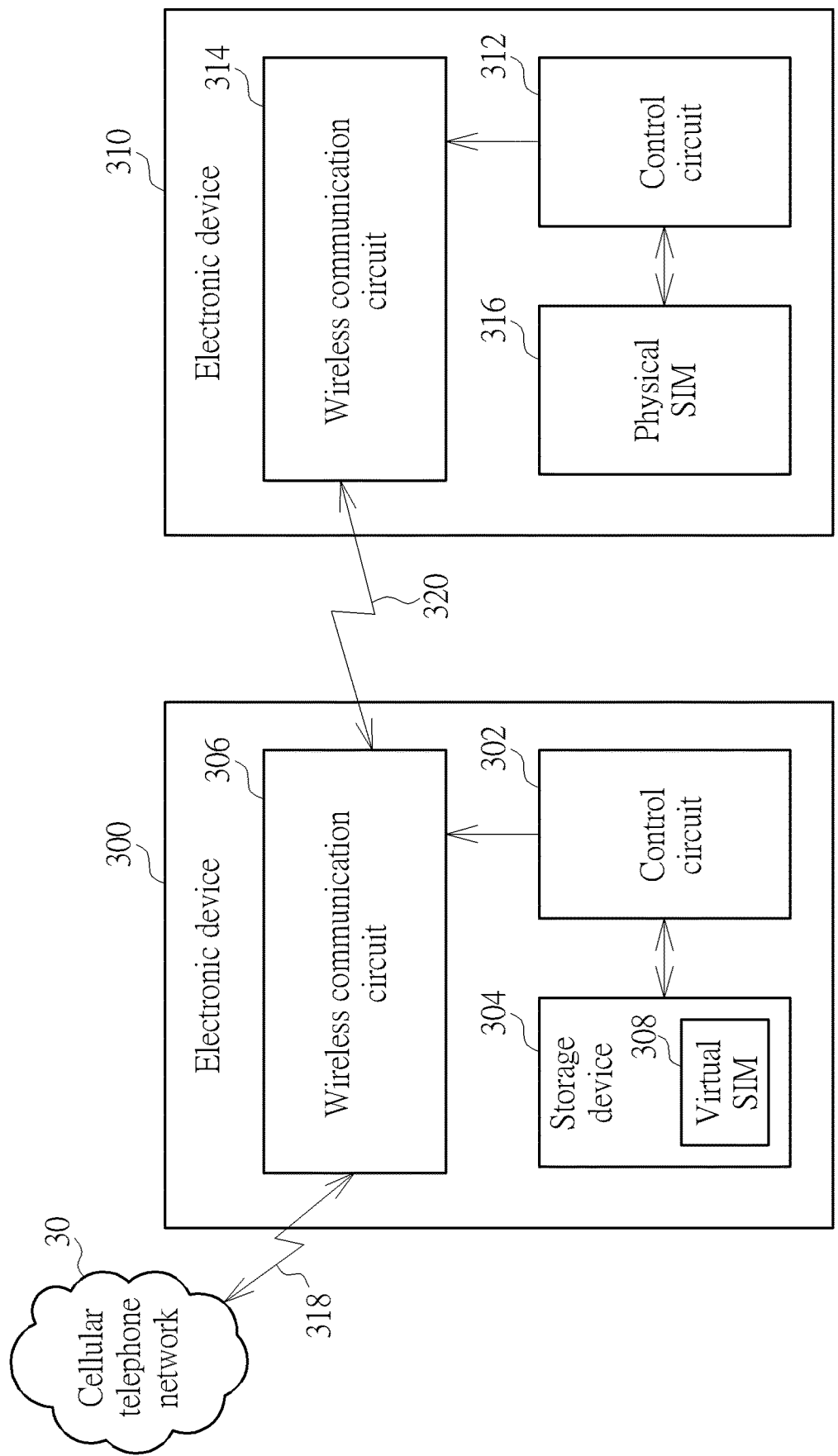
FIG. 3 is a diagram illustrating an electronic device with a virtual SIM configured by device-to-device SIM sharing according to an embodiment of the present invention.

FIG. 3 is a diagram illustrating an electronic device with a virtual SIM configured by device-to-device SIM sharing according to an embodiment of the present invention. The electronic device 300 includes a control circuit 302, a storage device 304, and a wireless communication circuit 306. The control circuit 302 may be a processor. The storage device 304 may be an internal memory device such as a random access memory or a flash memory. The wireless communication circuit 306 may include a baseband processing block and an RF processing block. In this embodiment, the wireless communication circuit 106 may employ multi-RAT architecture to support different wireless protocols. The storage device 304 is arranged to store a virtual SIM 308. The control circuit 302 is arranged to enable virtual SIM functionality on the electronic device 300. For example, software running on the control circuit 302 reads the virtual SIM 308 from the storage device 304, and simulates physical SIM behavior according to the virtual SIM 308. For example, the virtual SIM 308 may be a data set including a service-subscriber key used to identify a subscriber to a cellular telephone network (e.g., 5G network) 30. When the virtual SIM functionality is enabled, the wireless communication circuit 306 is arranged to establish a wireless communication link 318 with a cellular telephone network (e.g., 5G network) 30 via the virtual SIM 308.

The virtual SIM 308 stored in the storage device 304 may be configured through a device-to-device SIM sharing method. As shown in FIG. 3, the electronic device 300 also communicates with another electronic device 310. The electronic device 310 includes a control circuit 312, a wireless communication circuit 314, and a physical SIM 316 that requires a hardware support. For example, the physical SIM 316 may be a removable physical SIM card installed in the electronic device 310. For another example, the physical SIM 316 may be an embedded SIM (eSIM) soldered on the electronic device 310. The control circuit 312 may be a processor that controls the overall operation of the electronic device 314. When the electronic device 310 is in the proximity of the electronic device 300, a device-to-device SIM sharing procedure can be initiated. The wireless communication circuit 306 of the electronic device 300 is further arranged to establish a wireless communication link 320 with the wireless communication circuit 314 of another electronic device 310 that has the physical SIM 316 installed therein, and perform data exchange with another electronic device 310 for obtaining data of the physical SIM 316 from another electronic device 310 via the wireless communication link 320. Specifically, the control circuit 312 may enable data transfer of the physical SIM 316 through any feasible virtual SIM technology, such as Soft SIM or Remote SIM. The virtual SIM 308 is configured according to the data of the physical SIM 316, and stored in the storage device 304.

The wireless communication link 318 and the wireless communication link 320 may comply with different wireless protocols. For example, the wireless communication link 320 may be a Wi-Fi link (e.g., Wi-Fi-P2P link or Wi-Fi-Hotspot link). For another example, the wireless communication link 320 may be a BT link.

In some embodiments of the present invention, the electronic device 300 may be a Wi-Fi hotspot device, and the electronic device 310 may be a mobile terminal. For example, the electronic device 300 may be the aforementioned CPE 100, and the electronic device 310 may be the aforementioned cellular phone 204.

In some embodiments of the present invention, both of the electronic devices 300 and 310 may be mobile terminals. For example, the electronic devices 300 and 310 are cellular phones. The SIM authentication between the virtual SIM 308 and a virtual SIM server (not shown) may be achieved through the electronic device 310 that may be a cellular phone with a physical SIM (e.g., SIM card or eSIM). Hence, the electronic device 300 may be a cellular phone that is not required to have Internet access capability before the virtual SIM functionality is enabled on it. Considering a case where the physical SIM 316 is a physical 5G SIM card, the electronic device 300 may be a cellular phone that is capable of fully using the 5G bandwidth due to transfer of the 5G SIM capability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device comprising:
  a storage device, arranged to store a virtual subscriber identity module (SIM);
  a wireless communication circuit, arranged to establish a first wireless communication link with another electronic device that has a physical SIM installed therein, and obtain a physical ID of the physical SIM from said other electronic device via the first wireless communication link; and
  a control circuit, arranged to configure the virtual SIM according to the physical ID of the physical SIM of said other electronic device;
  wherein the wireless communication circuit is further arranged to establish a second wireless communication link with a cellular telephone network via the virtual SIM configured according to the physical ID of the physical SIM of said other electronic device, and to receive a voice call for the physical SIM of said other electronic device via the second wireless communication link from the cellular telephone network;

wherein when the wireless communication circuit receives the voice call for the physical SIM of said other electronic device, the control circuit is further arranged to relay the voice call to said other electronic device.

2. The electronic device of claim 1, wherein said other electronic device is a mobile terminal.

3. The electronic device of claim 1, wherein the electronic device is a customer premise equipment (CPE).

4. The electronic device of claim 1, wherein the first wireless communication link is a Wireless Fidelity (Wi-Fi) link or a Bluetooth (BT) link.

5. The electronic device of claim 1, wherein the cellular telephone network is a fifth generation of cellular technology (5G) network.

6. The electronic device of claim 1, wherein the control circuit is further arranged to enable said other electronic device having the physical SIM installed therein to communicate with the cellular telephone network only via the electronic device.

7. The electronic device of claim 1, wherein the control circuit is further arranged to enable Wi-Fi hotspot functionality on the electronic device operating under a Wi-Fi STA mode.

8. The electronic device of claim 1, wherein the control circuit is further arranged to communicate with said other electronic device operating under a Wi-Fi AP mode.

9. A device-to-device subscriber identity module (SIM) sharing method comprising:

establishing a first wireless communication link by a first electronic device with a second electronic device that has a physical SIM installed therein;

obtaining a physical ID of the physical SIM installed in the second electronic device from the second electronic device by the first electronic device via the first wireless communication link;

configuring a virtual SIM of the first electronic device according to the physical ID of the physical SIM of the second electronic device by the first electronic device;

establishing, by the first electronic device, a second wireless communication link with a cellular telephone network via the virtual SIM configured according to the physical ID of the physical SIM of the second electronic device; and when receiving a voice call for the physical SIM of the second electronic device via the second wireless communication link between the first electronic device and the cellular telephone network, relaying the voice call to the second electronic device.

10. The device-to-device SIM sharing method of claim 9, wherein the second electronic device is a mobile terminal.

11. The device-to-device SIM sharing method of claim 9, wherein the first electronic device is a customer premise equipment (CPE).

12. The device-to-device SIM sharing method of claim 9, wherein the first wireless communication link is a Wireless Fidelity (Wi-Fi) link or a Bluetooth (BT) link.

13. The device-to-device SIM sharing method of claim 9, wherein the cellular telephone network is a fifth generation of cellular technology (5G) network.

14. The device-to-device subscriber identity module (SIM) sharing method of claim 9, further comprising:

enabling the second electronic device having the physical SIM installed therein to communicate with the cellular telephone network only via the first electronic device.

15. The device-to-device subscriber identity module (SIM) sharing method of claim 9, further comprising:

enabling Wi-Fi hotspot functionality on the first electronic device operating under a Wi-Fi STA mode.

16. The device-to-device subscriber identity module (SIM) sharing method of claim 9, further comprising:

communicating with the second electronic device operating under a Wi-Fi AP mode.

\* \* \* \* \*